April 4, 1961
C. C. BERNITZ
2,977,777
EXPANSION COUPLING
Filed July 28, 1958
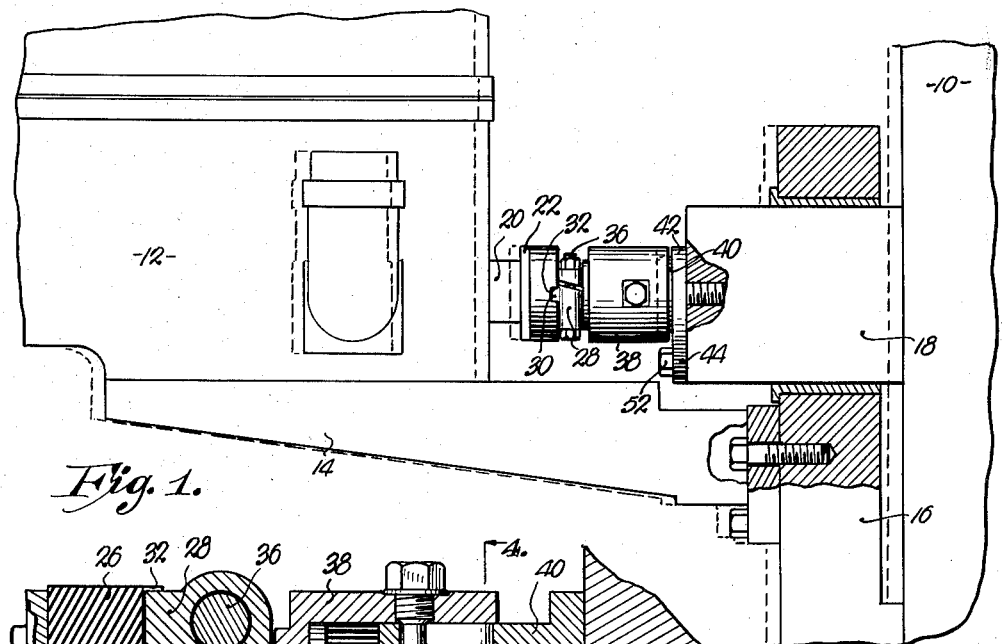
Fig. 1.
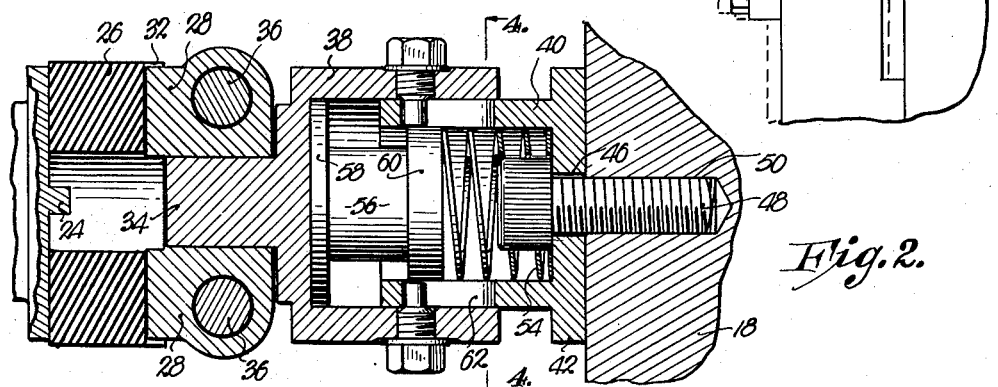
Fig. 2.
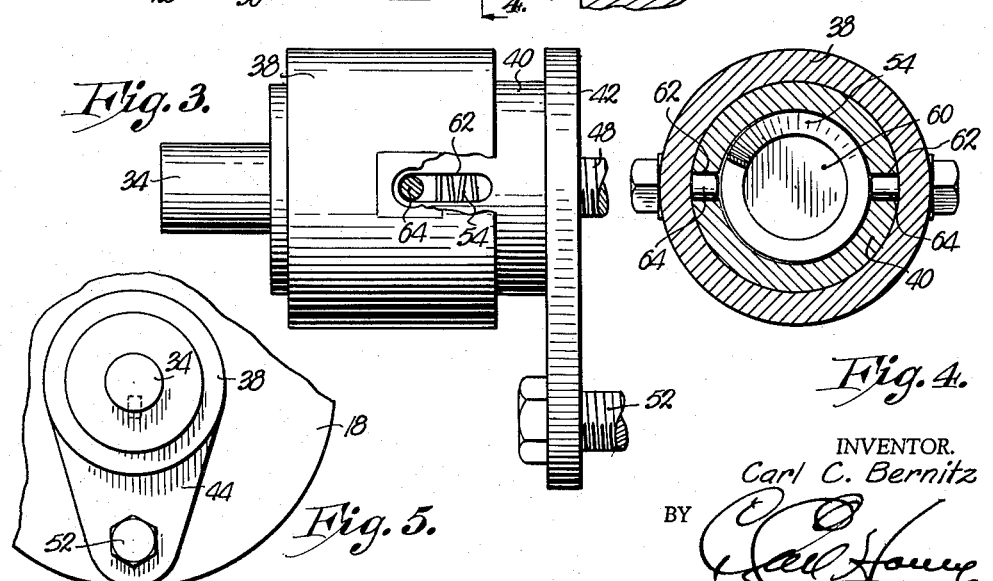
Fig. 3.
Fig. 4.
Fig. 5.
INVENTOR.
Carl C. Bernitz
BY
ATTORNEY.

United States Patent Office 2,977,777
Patented Apr. 4, 1961

2,977,777
EXPANSION COUPLING

Carl C. Bernitz, Kansas City, Mo., assignor to Maxine A. Niebrugge, Kansas City, Mo.

Filed July 28, 1958, Ser. No. 751,515

1 Claim. (Cl. 64—23)

This invention relates to expansion couplings adapted for interpositioning between normally longitudinally aligned shafts of an engine and its driven unit for the purpose of compensating for the expansion and contraction of the engine housing and associated parts, and to prevent such expansion from exerting a thrust upon the driven unit and the remaining parts constituting the interconnecting assembly.

The primary aim of this invention is a provision of an expansion coupling adapted for interpositioning between a prime mover and its driven unit, which coupling is constructed to absorb stresses and strains due to the normal expansion and contraction of the prime mover as it operates to drive the driven unit.

Other objects of the invention include the provision of an expansion coupling of the aforementioned character that is adaptable for use with standard prime mover and magneto assemblies where the shafts of the said prime mover and magneto are in substantial longitudinal alignment; a provision of a simply constructed, inexpensive and rugged coupling that will embody the broad concepts of the invention; the provision of an expansion coupling which may be quickly and easily installed and the provision of such an expansion coupling that will not be detrimental to the effective interconnecting of the prime mover and the driven unit shaft.

Specific details of construction, particularly as regards the minimum number of parts and the effective association of said parts, constitute additional objects of the invention, the preferred embodiment whereof, is illustrated in the accompanying drawing wherein:

Figure 1 is a side elevational view of the expansion coupling showing the same in operative position with a prime mover and its driven unit;

Fig. 2 is an enlarged fragmentary, longitudinal, central-sectional view through the expansion coupling, illustrating the same in the operative position;

Fig. 3 is a side elevational view of the expansion coupling removed from association with the equipment with which it is adapted for use;

Fig. 4 is a cross-sectional view taken on line 4—4 of Fig. 2; and

Fig. 5 is an end elevational view of the coupling.

For the purpose of adequately illustrating the function and operative location of the expansion coupling, the same is here illustrated as positioned between an engine or similar prime mover 10 and a magneto 12 which is supported by a bracket 14 carried by bearing 16 mounted on the engine block. The shaft 18 of engine or other similar prime mover is partially supported by bearing 16 and the shaft 20 of magneto 12 is flanged as at 22 and provided with radial ribs 24. A block of insulating material 26 having grooves provided therein for the reception of ribs 24 is also engaged by a clamp 28 by the clamp ribs 30 which enter radial slots 32 of block 26. Clamp 28 circumscribes stub shaft 34 constituting a part of the expansion coupling assembly to be hereinafter more fully described in detail and a tightening of bolts 36 constituting a part of clamp 28.

Stub shaft 34 is rigid to one of a pair of telescoping cups 38 having a substantially flat bottom wall and cylindrical side wall which circumscribes a like cylindrical side wall of companion cup 40, which, like cup 38, has a flat bottom wall 42 with a segment 44 extending radially from wall 42. An opening 46 provided in the bottom wall 42 of cup 40 receives a bolt 48 that is in screw-threaded engagement with a cavity 50 formed in the end of shaft 18 on the longitudinal axis thereof. A bolt 52 extends through segment 44 and into shaft 18 to cooperate with bolt 48 in establishing a driving connection between shaft 18 and cup member 40. The head of bolt 48 is within cup 40 and when the parts are to be assembled with shaft 18 and shaft 20 this bolt 48 is placed before cups 38 and 40 are moved into telescoping relation.

A spring 54 is within cup member 40 and has one end thereof against the bottom wall 42. The other end of spring 54 is engaged by a piston 56 flanged as at 58 to engage the bottom wall of cup 38 and flanged as at 60 to engage the one end of spring 54. The cylindrical wall of cup member 40 is provided with a pair of slots 62 into each of which is projected a pintle 64 which, in the illustrated embodiment of the invention, comprises a short bolt which passes through the cylindrical wall of cup member 38 and is held in screw-threaded engagement therewith by the inner engagement of the external threads of pintle 64 and the internal threads of the opening in the cylindrical wall of cup member 38 through which the pintle passes. As illustrated in Fig. 2, the pintles extend into slots 62 and thereby prevent relative rotation between cup members 38 and 40, yet allow longitudinal sliding thereof.

The positions of the parts illustrated in Fig. 2 indicate that spring 54 has fully expanded in response to movement of magneto 12 away from engine block 10 which movement is normally caused by an expansion of engine block 10 and bearing 16 carried thereby without expanding shaft 18. In the position of the parts shown in Fig. 1 spring 54 has been compressed to maintain a force upon cup member 38 and 40 which tends to move the same longitudinally apart and when engine block 10 and bearing 16 are shifted to the dotted-line position bracket 14 will likewise shift to move magneto 12 to the left as viewed in Fig. 1, all of which would tend to disengage the magneto from shaft 18, or exert an undesirable thrust upon the magneto. It is obvious from the foregoing that such expansion and contraction as might occur due to the heating and cooling of engine block 10 and that moves magneto 12 will be compensated for by spring 54. When the expansion coupling is inserted spring 54 is compressed and cup member 38 moved to the full telescoped position before clamp 28 is secured in place. The installation is accomplished when engine 10 is cool, therefore when operation commences and expansion occurs due to heating, spring 54 of the expansion coupling assembly and all the parts thereof which have been above defined will maintain a desirable interconnection between shaft 18 and shaft 20 of engine 10 and magneto 12 respectively. It is realized that expansion couplings having physical characteristics different than those illustrated in the accompanying drawing may be produced and used without departing from the spirit of the invention and, therefore, it is desired to be limited only by the scope of the appended claim.

Having thus described the invention what is claimed as new and desired to be secured by Letters Patent is:

An expansion coupling for operably interconnecting a pair of longitudinally aligned, rotatable shafts having shiftably spaced, opposed ends, said coupling comprising: a first cup member having a cylindrical side wall, an open end on the latter, and an end wall on the opposite end of the side wall; means on said end wall of the first cup member for securing the latter to said end of one of said shafts with the open end of said first cup member facing away from said end of said one shaft; a second cup member having a cylindrical side wall telescopingly received within said side wall of the first cup member for relative sliding movement between said side walls, an open end on the side wall of said second cup member disposed within said first cup member and facing said end wall of the latter, and an end wall on the opposite end of said second cup member, there being a number of closed, elongated slots in the side wall of said second cup member having their longitudinal axes parallel with the longitudinal axes of said shafts; a pintle mounted on the side wall of said first cup member for each of said slots respectively and extending into the latter; yieldably compressible, resilient means, including a spring, within said telescoped cup members and oppositely bearing against said respective end walls of the latter; and means on said end wall of the second cup member for securing the latter to said end of the other of said shafts.

References Cited in the file of this patent

UNITED STATES PATENTS

| | | |
|---|---|---|
| 235,679 | Glover | Dec. 21, 1880 |
| 2,325,184 | Jampoler | July 27, 1943 |
| 2,371,330 | Irstad | Mar. 13, 1945 |
| 2,468,182 | Dempsey | Apr. 26, 1949 |
| 2,598,780 | Garnier | June 3, 1952 |
| 2,765,991 | Frey et al. | Oct. 9, 1956 |
| 2,800,004 | Schroter | July 23, 1957 |